Patented May 4, 1954

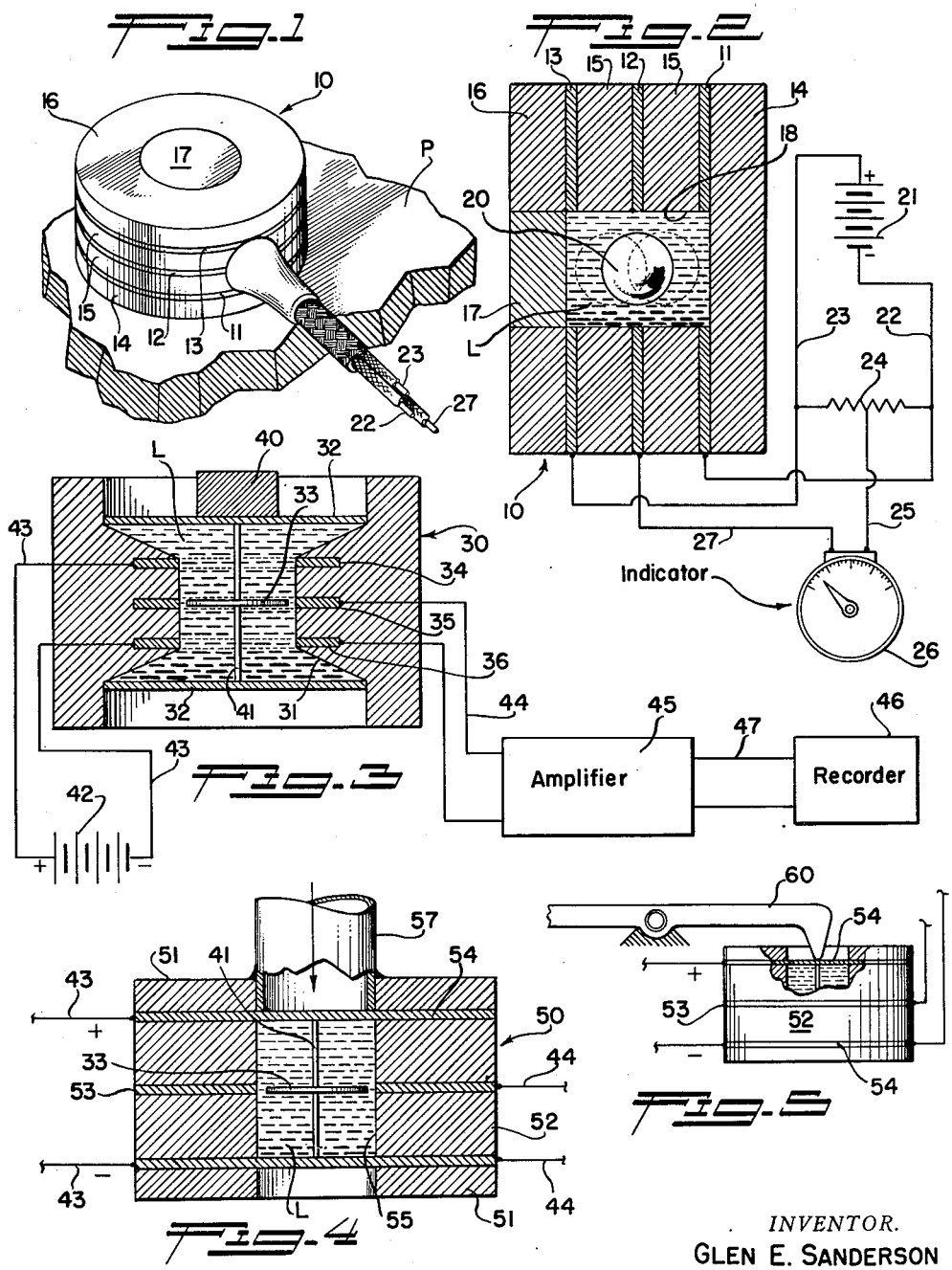

2,677,270

UNITED STATES PATENT OFFICE 2,677,270

VIBRATION, ACCELERATION, PRESSURE, AND POSITION PICKUP DEVICE

Glen E. Sanderson, Glendale, Calif., assignor to Lockheed Aircraft Corporation, Burbank, Calif.

Application March 25, 1949, Serial No. 83,368

9 Claims. (Cl. 73—70)

This invention relates to detectors or pick-ups for translating vibration, acceleration, pressure and mechanical movement into corresponding or representative variations in the voltage or current of electrical circuits.

Several types of devices have been introduced to detect or pick up vibration and appropriately influence or affect electrical indicators or recording circuits. Most of these devices are complicated and very expensive. Furthermore, such prior devices are usually quite large and heavy and, therefore, are not suitable for use in the investigation of the vibration, displacement or acceleration of aerodynamic surfaces, small mechanical and electrical devices, etc. where the installation of large, heavy equipment materially alters the vibration characteristics, etc. of the part or element being investigated. This fact has made it difficult, and sometimes impossible, to properly carry out such investigations.

It is an important object of the present invention to provide a vibration, acceleration, pressure and/or position pick-up that is small and exceedingly light in weight, so that it is adapted for vibration investigations and similar studies of small mechanical elements, etc. The minute size and weight of the unit adapts it for direct installation on air craft parts, small electrical equipment, etc. where the installation of the heavier, conventional pick-ups would be wholly impractical. In practice, the pick-up device of the invention may weigh only a fraction of an ounce and may have an outside diameter of approximately one-quarter inch and a height or thickness of approximately three-sixteenth inch, the weight and proportions of the device, of course, being subject to wide variations in different applications of the invention. In general, the device is similar in appearance to a small button or medicine tablet.

Another object of the invention is to provide a pick-up unit of the character referred to that is extremely simple and inexpensive to manufacture. The device does not require any moving mechanical parts and may be produced for only a small part of the cost of the conventional pick-up devices.

A further object of the invention is to provide a pick-up unit of the class referred to that is easy to install for use or service and that may be easily and quickly removed when no longer required. The device may be cemented in place or retained in position by a suitable cement, adhesive, adhesive tape, or the like, so as to be quickly detached after use without injuring or marring the part to which it was secured.

A still further object of the invention is to provide a device of the class mentioned that has a long operating life and that requires no repair or servicing.

Other objectives and features will be better understood from the following detailed description of several typical preferred forms of the invention throughout which description reference will be made to the accompanying drawings wherein:

Figure 1 is a perspective view on an enlarged scale of one form of the invention applied to a part;

Figure 2 is an enlarged, longitudinal, detailed sectional view of the device shown in Figure 1 associated with a suitable indicating circuit, the circuit being shown diagrammatically and the gas bubble of the device being shown in full lines in an operative position;

Figure 3 is a view similar to Figure 2, illustrating another form of the invention associated with a recording circuit;

Figure 4 is a view similar to Figure 2, illustrating still another form of the invention; and Figure 5 is a reduced elevation of yet another embodiment of the invention, with a portion broken away to appear in cross section.

The pick-up button or tablet of the invention illustrated in Figures 1 and 2, may be said to include a chambered casing 10 containing a conductive liquid L, and spaced electrodes 11, 12 and 13 in the casing contacted by the liquid.

The casing 10, which is preferably constructed of a dielectric or non-conductive material such as a ceramic or phenolic resin plastic, may be of practically any selected or required shape. In the drawings, the casing 10 is illustrated to be of cylindrical form having flat parallel ends and a cylindrically curved periphery, it being apparent that the casing may be square, rectangular, or of other shapes. The flat ends of the casing 10 facilitate the mounting or attachment of the unit and in Figure 1 the casing 10 has one end cemented or otherwise attached to the part P whose vibration is to be investigated. In the form of the invention being described, the casing 10 is made up of disc or washer-like parts 14, 15 and 16 of the selected dielectric material. The part 14 is in the nature of an imperforate disc and forms one end wall of the casing 10 while the parts 15 and 16 are annular members arranged in axial alignment. The annular part 16 has its central opening closed by a plug 17 which forms the opposite end wall of the casing 10. The aligned and communicating openings in the two central parts 15 constitute a closed chamber 18 for containing the liquid L.

The electrodes 11, 12 and 13 are carried by or embedded in the casing 10 to be contacted by the body of liquid L. Where the casing 10 is constructed of the washer- or disc-like parts 14, 15 and 16, the electrodes 11, 12 and 13 are secured between the opposing surfaces of the casing parts. Thus the electrodes 11, 12 and 13 are flat annular elements and may be alike or identical. The electrode 11 is positioned between the casing part 14 and the adjacent part 15. The electrode 12 is secured between the two intermediate casing parts 15 while the electrode 13 is engaged between the part 16 and the adjacent part 15. The laminated assembly of the electrodes and casing parts 14, 15 and 16 may be cemented, bonded, or fused together to constitute a sealed hollow cell. The inner peripheries of the electrodes 11, 12 and 13 are preferably flush with the inner surfaces of the annular casing parts 15, as illustrated, to assist in forming the smooth or regular wall of the chamber 18. The electrodes are preferably constructed of a material that is affected to a minimum extent by the liquid L and by the passage of the electrical current through the liquid. In practice the electrodes 11, 12 and 13 are formed of platinum, gold, silver, stainless steel, brass or cadmium plated brass. The outer peripheries of the electrodes 11, 12 and 13 are exposed, at least in part, at the exterior of the casing 10 to facilitate connection with elements of the indicating and/or recording circuit.

The invention contemplates the employment of any appropriate liquid L in the casing chamber 18. It is preferred to use a liquid having a low or relatively low electrical resistance and that has a low viscosity and a low freezing point. I have found it desirable to use ethylene glycol containing manganese nitrate in the proportion of from 0 to 10 parts by weight of the nitrate to each 100 parts by weight of the ethylene glycol. The manganese nitrate serves to decrease the electrical resistance of the liquid mixture, to reduce the effect of extraneous or external electric and magnetic fields upon the pick-up device and to allow more current to be used in the device so that less senstive indicator and/or recording circuits may be used. In accordance with the invention, a body or bubble 20 of a suitable gas is left or provided in the chamber 18. The bubble 20 may be of air and is preferably relatively small in volume compared with the volume of the liquid L. The bubble 20 of gas is a non-conducting body being a poor conductor of electricity whereas the body of liquid L is a relatively good conductor, there being a marked difference in the resistances of the liquid L and bubble 20. Further, the bubble 20 has a negligible or minimum mass to be substantially unaffected by acceleration, displacement and vibration, while the liquid L has a substantial mass to be materially affected by such forces. Thus, upon displacement or movement of the casing 10 there is relative movement between the liquid L and the bubble 20. It will be seen that upon relative movement between the liquid L and bubble 20 the resistance in the current paths between the electrodes 11 and 13 and the center electrode 12 changes or varies. The resultant variable potential is received by or impressed upon the indicator or recording circuit to provide the reading or record.

The pick-up may be used with practically any selected type of indicating or recording device. In Figure 2, the indicator circuit is of the bridge type including a battery or power source 21, leads 22 and 23 extending from the opposite terminals of the battery to the electrodes 11 and 13 respectively and a resistance 24 bridged between the leads 22 and 23 with a tap or lead 25 extending to one terminal of a suitable indicator 26. While I have shown a D. C. power source, it will be apparent that A. C. power may be employed, if desired, in which case an A. C. indicating circuit is used. An output conductor or lead 27 extends from the intermediate electrode 12 of the pick-up to the other terminal of the indicator 26. The indicator 26 may be a sensitive volt meter, a micro ammeter, a vacuum volt meter, or any other appropriate type of indicator. The pick-up may be used where only one electrode 11 or 13 and the electrode 12 are utilized. In this case, the power leads 22 and 23 and the output leads 27 are connected with the electrode 12 and the selected electrode 11 or 13 and the indicating device may be a current measuring meter connected in shunt relation to the output leads.

In providing the liquid L and bubble 20 in the casing 10, the casing parts 14, 15 and 16 and the electrodes 11, 12 and 13, may be assembled and sealed together as described above with the plug 17 omitted from the casing part 16. The liquid L is filled into the chamber 18 through the open annular end part 16 in a measured volume and the plug 17 is then inserted. The size or volume of the bubble 20 may be controlled by pushing the plug 17 inwardly to displace a small amount of liquid from the chamber 18 and then moving the plug outwardly to bring the outer end of the plug 17 to a given position or relationship relative to the end of the casing part 16 before finally fixing and sealing the plug in place. During the outward movement of the plug 17 air or gas is drawn into the chamber 18 to form the bubble 20.

It is believed that the operation of the pick-up unit shown in Figures 1 and 2 will be readily understood from the foregoing detailed description. With the casing 10 secured to the part P by cement or the like, and with the indicating circuit associated with the pick-up as illustrated, the device is ready for operation. It will be observed that the small light-weight casing 10 may be easily and quickly attached to or associated with the part to be investigated without affecting its vibration characteristics. The body of liquid L and the bubble 20 form a variable resistance between the two end electrodes 11 and 13 with the center electrode 12 serving as a center tap or output contact. As described above, displacement or vibration of the part P and casing 10 results in relative movement between the bubble 20 and the liquid L, the liquid moving with the casing 10 and in effect displacing the bubble from the wall of the chamber 18. This relative movement changes or varies the resistance in the circuit paths between the end electrodes 11 and 13 and the center electrode 12 and these variations are indicated by the indicator 26 to reveal the rate of acceleration, the frequency of the vibration, etc. When the device is at rest the bubble 20 lies against a wall of the chamber 18. However, as soon as vibration takes place the bubble is displaced to assume a position within the body of liquid L. Accordingly, the unit may be installed in any position without adversely affecting its operation. In the actual operation of a pick-up unit made in accordance with the invention employed with a 1.5 millivolt per G output, the device has indicated acceleration in the range between 0 and 22 G's, a G being equal to 32.2 ft. per second per second and has indicated and/or recorded vibration between two cycles per second and 2200 cycles per second, it being apparent that the ranges of operation may be varied in different forms and applications of the invention. From such data the amplitude of the vibration may be readily determined or calculated.

Figure 3 illustrates another pick-up of the invention, comprising a casing 30 having an internal liquid chamber 31, end diaphragms 32 for the chamber operating a dielectric member or disc 33, and electrodes 34, 35 and 36 exposed to the liquid in the chamber 31.

The casing 30 in this form of the invention may be a simple one-piece member of plastic, such as a phenolic resin or other suitable dielectric material. The casing 30 is tubular and is closed at its opposite ends by the diaphragms 32 to provide the liquid chamber 31. The end portions of the chamber 31 are enlarged in diameter and the diaphragms 32 are pressed, cemented, or otherwise sealed and secured at their peripheries in the enlarged end parts of the casing opening. The intermediate portion of the chamber 31, which is of reduced diameter, preferably has a cylindrically curved wall. The liquid L in the chamber 31 may be the same as the liquid L described above and completely occupies the chamber except for the member 33 to be described below.

The diaphragms 32, which may be identical, seal or close the ends of the chamber 31 and, as above described, their peripherial or marginal edges are secured to the casing 30. The diaphragms 32 are flexible and resilient and because the liquid L is practically incompressible, the flexure of one diaphragm is accompanied by corresponding movement of the other diaphragm. Where the pick-up is used to measure acceleration during steady conditions, a mass 40 of lead, steel, or other massive material, is engaged on or secured to the outer side of one diaphragm 32. It will be seen that the forces on the mass 40 operate against the diaphragm spring force to move or flex the diaphragms 32.

The above mentioned member 33 is associated with or connected to the diaphragms 32 to move therewith. In practice, the member 33 may be a disc-shaped part of less diameter than the reduced portion of the chamber 31 and is positioned substantially mid-way between the opposite ends of the chamber. Slender stems 41 carry the member 33 and extend in opposite directions therefrom to have their outer ends secured to the inner sides of the diaphragms 32. The stems 41 hold the member 33 in spaced concentric relation to the walls of the chamber 31 and transmit movement from the diaphragms to the member. The member 33 and its stems 41 are formed of a dielectric material such as a plastic to have a much higher electrical resistance than the conductive liquid L. With the diaphragms 32 in the normal or unflexed positions the dielectric member 33 lies in the same transverse plane as the intermediate electrode 35.

In this form of the invention the electrodes 34, 35 and 36 are cast or embedded in the material of the casing 30. The electrodes may be annular plates or washer-like parts and are arranged so that their inner peripheries are exposed at the cylindrical wall of the intermediate portion of the chamber 31 so as to be contacted by the liquid L. The electrodes 34, 35 and 36 may be formed of the same material as the electrodes 11, 12 and 13, described above, and are spaced apart axially with the electrode 35 in the middle portion of the casing 30 and the electrodes 34 and 36 spaced at the opposite sides of the center electrode.

I have shown a recording circuit associated with the pick-up unit of Figure 3, it being understood that an indicating circuit such as shown in Figure 2 may be used with the device of Figure 3 if desired. The circuit of Figure 3 includes a battery or power source 42 having leads 43 extending to the end electrodes 34 and 36. Output leads 44 extend from an end electrode 36 and the center electrode 35 to a suitable vacuum tube amplifier 45. The amplified signal or response is transmitted to an oscillograph recorder 46 or the equivalent through lines 47.

In the operation of the device of Figure 3, the casing 30 is cemented or otherwise attached to the part whose acceleration or vibration is to be investigated and the pick-up unit may be connected with the recording circuit, as illustrated. When used as a vibration pick-up, the mass 40 may be left off or detached from the diaphragm 32 and the vibratory forces may act directly upon the liquid mass L to produce relative movement between the liquid and the casing 30. This is accompanied by flexure of the diaphragms 32 and movement of the member 33 in the axial direction. When the unit is to be used to measure acceleration during steady conditions or at 0 frequency or low frequencies, the mass 40 is attached to the diaphragm 32 so that the acceleration forces of the mass 40 act against the spring force of the diaphragms 32 to flex the diaphragms and move the member 33 in the axial direction. Axial movement of the non-conductive member 33 produced in any manner results in variations in the resistance of the current paths between the electrodes 34 and 36 and the intermediate electrode 35. These variations in the circuit are transmitted to the amplifier 45 and the recorder 46 and reflect the rate of acceleration, the frequency of the vibrations, etc.

Figure 4 illustrates still another embodiment of the invention in which the casing 50 is a laminated assembly comprising two end parts 51 and two intermediate parts 52. The parts 51 and 52 are formed of plastic or other suitable non-conductive material. An intermediate electrode 53 is secured and sealed between the two intermediate casing parts 52. The casing parts 51 and 52 are tubular or annular and are arranged in axial alignment to leave or define a central axial opening. Flexible diaphragms 54 are secured and sealed between the two end parts 51 and the adjacent intermediate parts 52 and extend across the axial opening to close its ends and thus define a closed liquid chamber 55. In this construction the diaphragm 54 also serves as the end electrodes. The electrodes 53 and diaphragms 54 may be formed of the same materials as the electrodes 11, 12 and 13 described above, or may be of any other appropriate conductive material. The dielectric member 33 is arranged in the chamber 55 to normally lie in the same plane as the intermediate electrode 53 and to be spaced from the wall of the liquid chamber 55. The stems 41 of the member 33 have their ends secured to the diaphragms 54.

A liquid L, such as described above, occupies the casing chamber 55.

The pick-up unit of Figure 4 may be employed in the same manner as the units described above. However, in the drawings, I have shown a pressure tube 57 connected with the casing 50 to apply fluid pressure to the external surface of one of the diaphragm electrodes 54. A reference pressure acts upon the outer surface of the other diaphragm 54. This reference pressure may be atmospheric pressure or, in other installations, may be superatmospheric or subatmospheric pressure. The pressure to be measured, conducted or carried by the tube 54, acts upon the adjacent diaphragm 54 to flex the same and thus move the dielectric member 53 with reference to the intermediate electrode 53. As previously described, such movement of the non-conducting member 33 influences the indicating or recording circuit to provide a reading or record corresponding to the fluid pressure being measured. While any selected form of indicating and/or recording circuit may be associated with the unit of Figure 4, I have shown the power lines 43 connected with the diaphragm electrodes 54 and the two output lines 44 connected with the intermediate electrode 53 and one diaphragm electrode 54. It will be apparent that the pressure pick-up of Figure 4 may be employed as an acceleration or vibration pick-up in the same manner as the unit of Figure 3 and, if desired, the unit of Figure 3 may be employed as a fluid pressure pick-up by imposing a reference pressure on one diaphragm 32 and by applying the pressure to be measured on the other diaphragm 32.

Figure 5 illustrates the manner in which a pick-up of the invention may be employed as a position responsive device. The pick-up unit of Figure 5 may be the same as the one illustrated in Figure 3 or may be the unit shown in Figure 4. The mechanical part, whose position or motion is to be measured, may directly engage a diaphragm 54 or may act on the diaphragm through intervening structure or linkage. In the drawings I have shown a lever 60 arranged to have a point or end part bear on the external surface of one of the diaphragms 54. It will be seen that motion of the lever 60 results in corresponding movement of the non-conducting member 33 and a variation in the resistance of the circuit leading to the indicating or recording device. In actual practice, very small or minute motions can be accurately measured with the pick-up. The operative range of one of the units of the invention employed as a position or motion transmitter was between 10 and 100 micro inches, although this range may be varied by altering the proportions, shapes, etc. of the active parts of the pick-up.

Having described only typical forms of the invention I do not wish to be limited to the specific details herein set forth, but wish to reserve to myself any variations or modifications that may appear to those skilled in the art and fall within the scope of the following claims.

I claim:

1. A device for detecting vibration, acceleration, and the like, comprising a circuit including a pair of input leads, an output lead, and a device actuated by the output lead for measuring electrical changes in the circuit, an electrically non-conductive casing having a chamber, a low viscosity electrically conductive liquid contained in the chamber, two spaced annular input electrodes connected with said input leads and carried by the casing to have their annular inner peripheries continuously completely contacted by the liquid at the wall of the chamber during vibration and acceleration of the casing, an annular output electrode connected with the input lead and carried by the casing to have its annular inner periphery spaced between the peripheries of the input electrodes and continuously completely contacted by the liquid at the wall of the chamber during vibration and acceleration of the casing so that the liquid forms electrical paths between the input and output electrodes, and a non-conductive gas bubble in the liquid displaced therein upon movement of the casing to be clear of said electrode surfaces and to vary the cross sectional areas of said electrical paths.

2. A device for picking up vibration and acceleration comprising a detecting circuit including input leads, an output lead and a detecting device connected with the output lead and sensitive to electrical changes in the circuit, a casing including a plurality of dielectric parts arranged in end to end relation, at least two of the parts being annular to leave an internal chamber in the casing, annular electrodes secured and sealed between the ends of adjacent casing parts and exposed at the wall of the chamber, one electrode being connected with the output lead and the others being connected with the input leads, a conductive liquid in the chamber continuously and completely contacting each of the electrodes during vibration and displacement of the casing to provide electrical paths between the electrodes, and a non-conductive gas bubble in the liquid displaced relative to the casing and remaining clear of the electrodes during vibration and displacement of the casing to vary the cross sectional areas and the resistance of said electrical paths and thus actuate said detecting device.

3. A detecting button for translating vibration, acceleration, pressure and mechanical movement comprising a detecting circuit having two inlet leads, an output lead, two disc-shaped input electrodes connected to said input leads, a disc-shaped output electrode connected to said output lead having a central opening therein, said electrodes being axially aligned with and in spaced relation to one another, dielectric material maintaining said electrodes in spaced relation and forming therewith a chamber, a low viscosity electrically conductive liquid filling said chamber, said electrodes being in contact with said liquid, and a non-conductive body in said liquid capable of movement therein whereby a physical force acting on said button causes movement of said non-conductive body so as to vary the resistance of the electric path through said liquid.

4. A detecting button for translating vibration, acceleration, pressure, and mechanical movement comprising a detecting circuit having two input leads, an output lead, two disc-shaped input electrodes connected to said input leads, a disc-shaped output electrode connected to said output lead having a central opening therein, said electrodes being axially aligned with and in spaced relation to one another, dielectric material maintaining said electrodes in spaced relation and forming therewith a chamber equal in width to the central opening of said output electrode, the inner periphery of said output electrode forming a portion of the wall of said chamber, a low viscosity electrically conductive liquid filling said chamber, said electrodes being in contact with said liquid, and a non-conductive body in said liquid capable of movement therein whereby a physical force acting on said button causes movement of said non-conductive body so as to vary the resistance of the electric path through said liquid.

5. A detecting button for translating vibration, acceleration, pressure and mechanical movement comprising a detecting circuit having two input leads, an output lead, two disc-shaped input electrodes connected to said input leads, a disc-shaped output electrode connected to said output lead having a central opening therein, said electrodes being axially aligned with and in spaced relation to one another, dielectric material maintaining said electrodes in spaced relation and forming therewith a chamber equal in width to the central opening of said output electrode, the inner periphery of said output electrode forming a portion of the wall of said chamber, a low viscosity electrically conductive liquid filling said chamber, said electrodes being in contact with said liquid, and a gas bubble in said liquid capable of movement therein whereby a physical force acting on said button causes movement of said gas bubble so as to vary the resistance of the electric path through said liquid.

6. A detecting button for translating vibration, acceleration, pressure and mechanical movement comprising a detecting circuit having two input leads, an output lead, two disc-shaped input electrodes connected to said input leads, a disc-shaped output electrode connected to said output lead, said discs having central openings therein, said electrodes being axially aligned with and in spaced relation to one another, dielectric material maintaining said electrodes in spaced relation and forming therewith a chamber equal in width to the central opening of said output electrode, the inner peripheries of said electrodes forming a portion of the wall of said chamber, a low viscosity electrically conductive liquid filling said chamber, said electrodes being in contact with said liquid, diaphragms sealing the ends of said chamber and in contact with said liquid, and a non-conductive body in said liquid capable of movement therein connected to at least one of said diaphragms to be initially positioned adjacent said output electrode whereby a physical force acting on said at least one of said diaphragms causes movement of said non-conductive body so as to vary the resistance of the electric path through said liquid.

7. A detecting button for translating acceleration, comprising a detecting circuit having two input leads, an output lead, two disc-shaped input electrodes connected to said input leads, a disc-shaped output electrode connected to said output lead having a central opening therein, said electrodes being axially aligned with and in spaced relation to one another, dielectric material maintaining said electrodes in spaced relation and forming therewith a chamber equal in width to the central opening of said output electrode, the inner periphery of said output electrode forming a portion of the wall of said chambers, a low viscosity electrically conductive liquid filling said chamber, said electrodes being in contact with said liquid, diaphragms sealing the ends of said chamber and in contact with said liquid, a weight secured to one of said diaphragms, and a disc of dielectric material in said liquid mounted on a shaft supported by said diaphragms capable of movement therein to be initially positioned adjacent said output electrode whereby upon acceleration of the button the inertia of the weight causes movement of said disc so as to vary the resistance of the electric path through said liquid.

8. A detecting button for translating vibration, acceleration, pressure and mechanical movement comprising a detecting circuit having two input lead, an output lead, two disc-shaped input electrodes connected to said input leads, a disc-shaped output electrode connected to said output lead having a central opening therein, said electrodes being axially aligned with and in spaced relation to one another, dielectric material maintaining said electrodes in spaced relation and forming therewith a chamber equal in width to the central opening of said output electrode, the inner periphery of said output electrode forming a portion of the wall of said chamber, said input electrodes sealing the ends of said chamber and acting as diaphragms, a low viscosity electrically conductive liquid filling said chamber, said electrodes being in contact with said liquid, and a non-conductive body in said liquid capable of movement therein connected to at least one of said diaphragms to be initially positioned adjacent said output electrode whereby a physical force acting on said at least one of said diaphragms causes movement of said non-conductive body so as to vary the resistance of the electric path through said liquid.

9. A detecting button for translating vibration, acceleration, pressure and mechanical movement comprising a detecting circuit having two input leads, an output lead, two disc-shaped input electrodes connected to said input leads, a disc-shaped output electrode connected to said output lead having a central opening therein, said electrodes being axially aligned with and in spaced relation to one another, dielectric material maintaining said electrodes in spaced relation and forming therewith a chamber equal in width to the central opening of said output electrode, the inner periphery of said output electrode forming a portion of the wall of said chamber, said input electrodes sealing the ends of said chamber and acting as diaphragms, a low viscosity electrically conductive liquid filling said chamber, said electrodes being in contact with said liquid, an air pressure supply member having one end secured to and sealed off by one of said input electrodes, and a non-conductive body in said liquid capable of movement therein connected to said one diaphragm to be initially positioned adjacent said output electrode whereby air pressure supplied by said member acting on said one input electrode causes movement of said non-conductive body so as to vary the resistance of the electric path through said liquid.

References Cited in the file of this patent

UNITED STATES PATENTS

| Number | Name | Date |
| --- | --- | --- |
| 1,932,329 | Urfer | Oct. 24, 1933 |
| 2,367,465 | Kunzer | Jan. 16, 1945 |
| 2,387,313 | Wilson, Jr. | Oct. 23, 1945 |
| 2,397,962 | Hartz | Apr. 9, 1946 |
| 2,446,180 | Haskins, Jr. | Aug. 3, 1948 |

FOREIGN PATENTS

| Number | Country | Date |
| --- | --- | --- |
| 345,081 | Italy | Dec. 15, 1936 |